United States Patent [19]

White et al.

[11] Patent Number: 4,842,018

[45] Date of Patent: Jun. 27, 1989

[54] VALVE ASSEMBLY

[76] Inventors: Jeffrey A. White, 9 The Mews, Ottawa, Ontario, Canada, K1M 2G3; Bruno Tolledi, 641 Bathgate Drive, Ottawa, Ontario, Canada, K1K 3Y3; T. Rayman Ringer, 10 Oriole Dr., Ottawa, Ontario, Canada, K1J 7E9; Andrzej Arkuszewski, 10-21 Bayshore Dr., Ottawa, Ontario, Canada, K2B 6M7

[21] Appl. No.: 40,045

[22] Filed: Apr. 13, 1987

[51] Int. Cl.[4] .............................................. F16K 31/58
[52] U.S. Cl. .............................. 137/614.11; 137/625.3; 251/121
[58] Field of Search ................... 137/614.2, 272, 283, 137/284, 301, 614.11, 901, 625.3; 251/82, 121, 205, 210

[56] References Cited

U.S. PATENT DOCUMENTS

| 424,715 | 4/1890 | Knickerbacker | 137/284 |
|---|---|---|---|
| 624,502 | 5/1899 | Kopen | 137/283 |
| 1,062,614 | 5/1913 | Sneddon | 251/210 X |
| 1,099,719 | 6/1914 | Ovenden | 137/901 X |
| 1,349,062 | 8/1920 | Goldberg | 137/283 |
| 1,693,676 | 12/1928 | Spinelle | 251/82 |
| 1,802,897 | 4/1931 | Holden et al. | 251/121 |
| 4,130,611 | 12/1978 | Brand | 137/625.3 X |
| 4,483,361 | 11/1984 | Jungbert, Sr. | 137/301 |
| 4,567,915 | 2/1986 | Bates | 137/625.3 X |

Primary Examiner—A. Michael Chambers
Assistant Examiner—John C. Fox
Attorney, Agent, or Firm—Francis W. Lemon

[57] ABSTRACT

This relates to a valve assembly or hydrant which is particularly suitable for use in conditions where freezing temperatures may be encountered, such as in water supply systems for snowmaking equipment and the like as commonly used in ski resort areas. The valve assembly comprises a valve body, a perforated valve insert in the valve body, a control member movable along the valve insert, and a ball engaging a valve seat in the valve insert. Movement of the control member releases the ball and then progressively opens the perforation thus providing accurate and stable flow control under a wide range of back pressures. The flow closure and control are separate from one another and the shut-off is not prone to failure or fouling as a result of debris in the water supply. The valve assembly can be controlled in such a manner as to provide a straight line flow versus valve opening position function.

2 Claims, 3 Drawing Sheets

VALVE ASSEMBLY

BACKGROUND OF THE INVENTION

This invention relates to a valve assembly or hydrant which is particularly suitable for, although not limited to, use in conditions where freezing temperatures may be encountered, such as in water supply systems for snowmaking equipment and the like as commonly used in ski resort areas.

Hydrants for use in conjunction with snowmaking equipment have traditionally suffered from several disadvantages. Certain designs were prone to failure under freezing conditions owing to freezing up of certain components, other designs were difficult to service and required the digging up of the entire valve assembly to allow replacement of certain parts. The fouling of the closure and control assembly, the result of debris in the supply water, has been a common problem. Many designs were also not capable of providing for accurate and stable control of the flow under the range of pressures likely to be encountered during use.

SUMMARY OF THE INVENTION

It is a basic objective of this invention to provide a valve assembly, such as a water hydrant, which is capable of providing accurate and stable flow control under a wide range of back pressures.

A further object of the invention is to provide a valve assembly wherein the flow closure and control are separate from one another.

It is a further object to provide a valve assembly wherein the flow closure or shut-off is not prone to failure or fouling as a result of debris in the water supply.

A further object is to provide a valve assembly or hydrant capable of being controlled in such a manner as to provide a straight line flow versus valve opening position function.

It is a further object of the invention to provide a hydrant assembly which is resistant to freezing up and which hydrant assembly is serviceable from above to avoid the need to dig up the entire assembly to allow access as in previous designs.

Numerous additional objectives and advantages of the invention will become apparent from the following description.

According to the present invention there is provided a valve assembly, comprising
- (a) a valve body,
- (b) a valve insert in said valve body defining a flow passage, said valve insert having a plurality of flow outlet orifices therefrom spaced therealong,
- (c) a valve seat in said valve insert and located in said flow passage,
- (d) shut-off means comprising a ball in said valve insert and engageable with said valve seat to make line contact therewith, and
- (e) a close fitting control member in said flow passage for closing said flow outlet orifices in a closed position, and movable along said flow passage to free said ball from said valve seat and then, after moving a predetermined distance along said flow passage to avoid high velocity cavitation, selectively opening said flow outlet orifices in dependance of the position of said control member along said flow passage to control the rate of flow of fluid through said valve seat, along said flow passage and out of the opened flow orifices into said valve body.

As a major feature of the invention, the above stated further means functions essentially independently of the shut-off means to effect the control of the rate of fluid.

The means defining the flow channels advantageously includes a cylindrical chamber with the movable control member being located in such chamber and movable along it in close-fitting relation to the wall of the chamber. The flow orifices extend through the chamber wall and they are opened or closed in accordance with the position of the control member.

As a significant feature of the invention the flow orifices are sized and arranged such that the total flow passing through the flow orifices varies directly in accordance with the position of the control member along the flow passage.

In the preferred embodiment of the invention, the shut-off means comprises a metal ball with the valve seat being arranged to make line contact with such ball on closure thereby reducing surface jamming or the collection of dirt and debris on the seat.

In the preferred form of the invention, the means defining the flow orifices is integrally formed with the valve seat such that together they define an elongated valve insert. The valve assembly further includes a valve body into which the insert is threaded, with the valve body having an annular recess therein to receive the flow passing through the flow orifices. Preferably, screw threads are associated with the control member such that rotation of same causes the control member to move along its path of travel within the valve insert. Furthermore, it is preferred that the elongated valve insert include screw threads which engage with the screw thread associated with the movable control member. An elongated valve stem is connected to the control member for rotating the same.

In a typical embodiment of the invention, an elongated conduit surrounds the valve stem and is connected to the valve body so as to receive the flow passing into the annular recess in the valve body. An elbow is connected to the conduit in spaced relation to the valve body to conduct the flow away from the conduit. The valve stem passes through the elbow and a suitable seal is provided to prevent fluid leakage between the stem and elbow.

The valve insert and the conduit are preferably threaded into the valve body such that the valve can be serviced by removal of the complete valve insert, valve stem and control member while the valve body remains in situ.

The valve assembly is preferably provided with a drip-check valve in the valve body to drain the assembly after the valve has been shut off. The use of suitable drainage means is of course mandatory under freezing conditions.

BRIEF DESCRIPTION OF THE VIEWS OF DRAWINGS

A preferred embodiment of the invention will now be described with reference to the appended drawings wherein.

Figure 2:
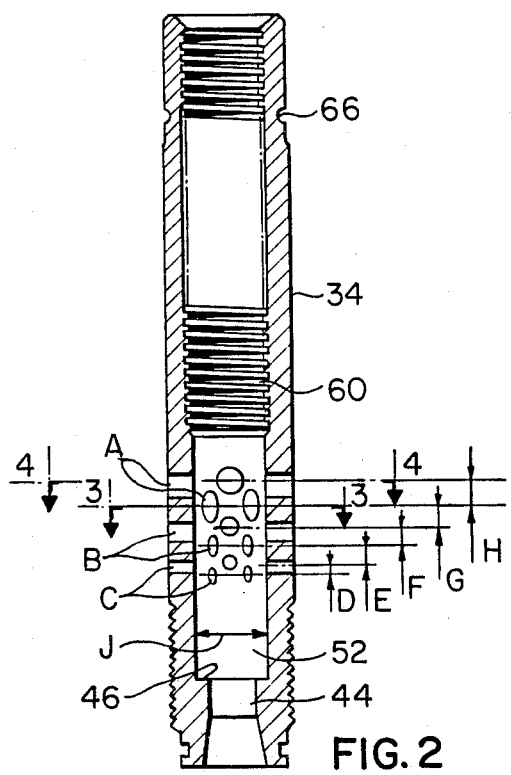
FIG. 2 is a longitudinal section of the valve insert particularly illustrating the arrangement and layout of the flow orifices.
Figure 5:
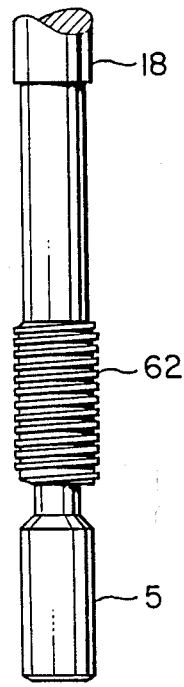
Figure 3:
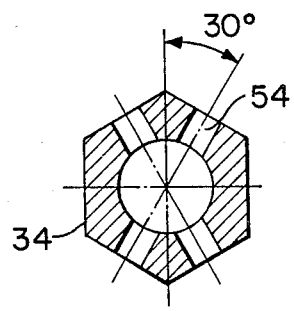
Figure 4:
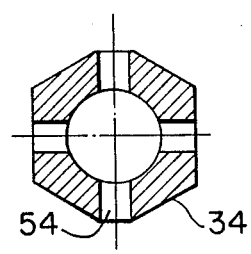
Figure 6:
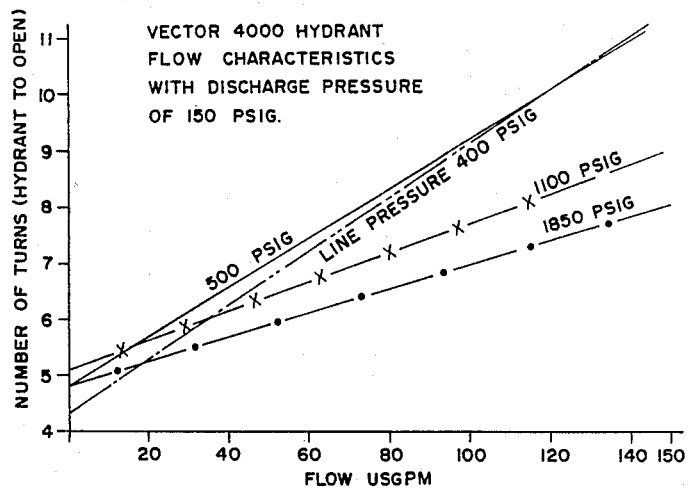

FIGS. 3 and 4 are cross section views taken along lines 3 and 4 respectively of FIG. 2;

FIG. 5 is a view of the flow control member and valve stem;

FIG. 6 is a graph wherein total flow through the hydrant is plotted against the position of the valve control member (in terms of the number of turns of the valve stem from the closed position).

Figure 7:
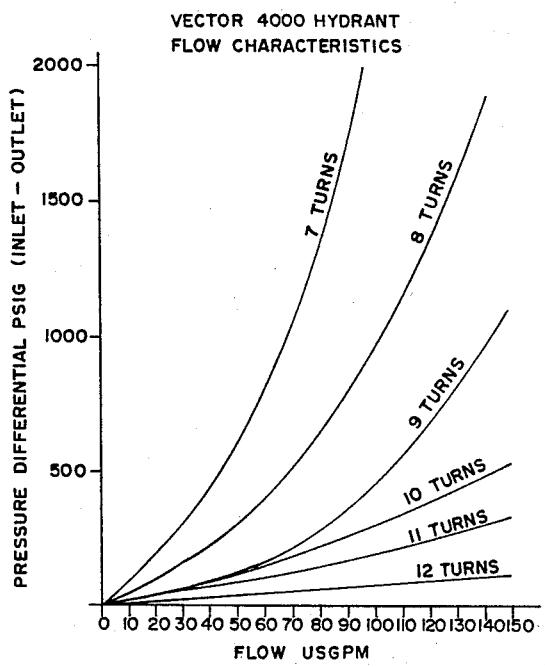

FIG. 7 is a further graph of differential pressures vs. volume flows for given numbers of opening turns of the valve stem.

(Both of the above-noted graphs show the flow characteristics of a hydrant having the dimensions noted on FIG. 2 and the following Table.)

DETAILED DESCRIPTION OF THE PREFERRED EMBODIMENT

With reference now to the drawings there is shown a hydrant 10 including a valve body 12 at the lower end of same and a 90 degree elbow 14 at the upper or head end of the hydrant. An elongated standpipe 16 is connected via screw threads at its opposing ends to the valve body 12 and to the elbow 14. An elongated valve stem 18 extends from a point above elbow 14 downwardly through the elbow, through stand pipe 16 and into the valve body 12 for control purposes as will be more fully described hereinafter. A control handle 20 connected to the upper end of the valve stem is also provided. The valve stem 18 extends through a packing nut 22, the latter being threaded into elbow 14 with the inner end of packing nut 22 bearing against an annular body 24 of packing material which snugly surrounds the valve stem 18 and prevents leakage of liquid therearound.

The elbow 14 may also be provided with a rupture disc assembly 26 thereby to avoid damage to the hydrant assembly in the event an over-pressure condition is reached. This of course is an optional feature.

The valve body 12 is provided at its lower end with an externally threaded nipple which allows the valve body to be threaded into a suitably threaded opening in a water supply main, a portion of the wall of which is illustrated by item 30.

The interior of valve body 12 is provided with a series of serially arranged concentric bores, the lowermost bore 32 being threaded to receive an elongated valve insert 34. The second bore 36 provides an annular recess surrounding valve insert 34 in radically spaced relation thereto, while the uppermost threaded bore 38 receives the lower end of the aforementioned standpipe 16. The lowermost end of the valve body 12 includes an inwardly converging passage 40 which admits water from the supply main 30 into the interior of the valve body.

The above-noted valve insert 34 is externally threaded at its lower end for engagement with the threads of bore 32. An O-ring seal 42 at the lower end of the valve insert prevents by-pass of the pressurized liquid. The lower end of valve insert 34 defines a flow passage 44 which mates with the passage 40 provided in the lower end of the valve body 12. An annular step surrounding this flow passage 44 defines a valve seat 46 and a hardened steel ball 48 which seats on valve seat 46 defines the flow shut-off member.

The lower end of the valve stem 18 is provided with an integrally formed cylindrical control member 50. This control member 50 is positioned within the correspondingly sized cylindrical chamber 52 defined within the lower end of valve insert 34 above the valve seat 46. The wall of the cylindrical chamber thus formed is provided with a series of radially arranged flow orifices 54. These flow orifices 54 are disposed in overlapping and somewhat staggered relationship to one another with the orifice diameters increasing as their distance away from the valve seat 46 increases. The lowermost flow orifices 54 are spaced a selected distance away from valve seat 46 for reasons to become clear hereafter.

Figure 1:
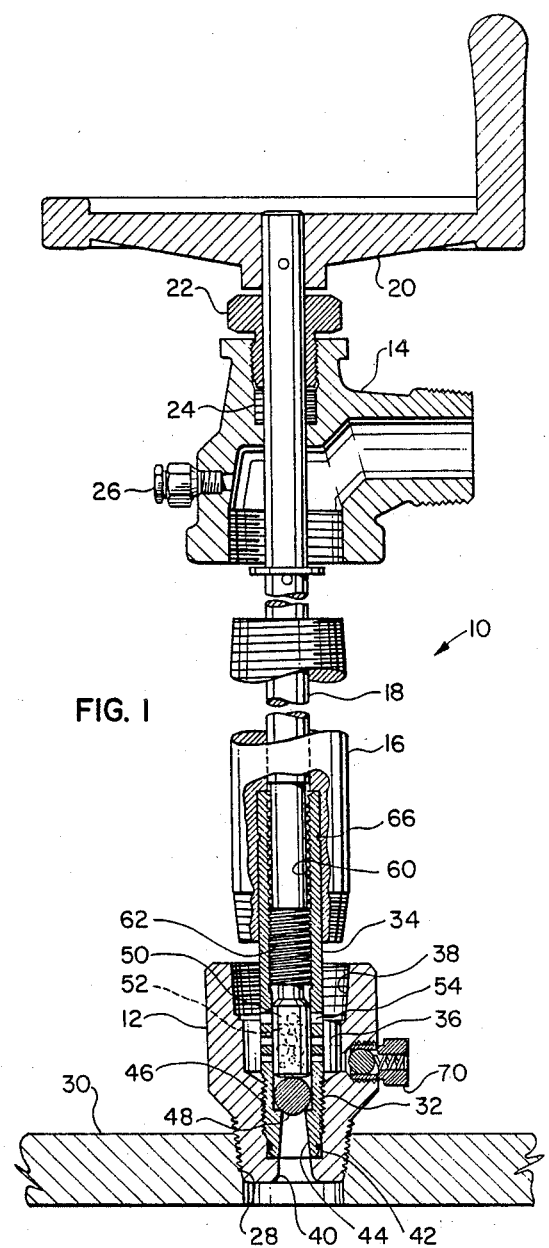
FIG. 1 is a longitudinal section view of the complete hydrant assembly.

It will be apparent that the shut-off ball 48 is disposed between valve seat 46 and the end of the cylindrical control member 50. With the control member 50 in its lowermost position as illustrated in FIG. 1, it bears against the shut-off ball 48 and presses the ball against the valve seat 46 with which it makes full line contact. This prevents any flow of water whatsoever through the valve assembly.

In order to effect travel of the cylindrical control member 50 within the chamber defined in the valve insert 34, the interior upper portion of valve insert 34 is provided with screw threads 60 which mate with corresponding screw threads 62 formed on a section of the valve stem 18 a very short distance above the cylindrical control member 50. Rotation of the valve stem 18 thus causes the control member 50 to rotate within the chamber 52 and to move upwardly or downwardly therein depending upon the direction of rotation.

It was noted previously that the lowermost flow control orifices 54 were located a preselected distance above the valve seat 46. In a preferred version of the valve, the arrangement is such that the valve stem must be rotated approximately 4 turns until such time as the lowermost edge of the flow control member 50 has reached the lowermost flow orifices 54 whereupon flow therethrough can commence. The shut-off ball 48 is of course lifted clear of the valve seat 46 by the pressurized water from the supply main and since the shut-off ball 48 is sized so as to be somewhat smaller than the interior of the control chamber 52, it does not significantly impede the flow. As rotation of the valve stem 18 continues, further flow orifices 54 are exposed thus causing the flow rate through the valve to increase. By selecting the number and size of the flow orifices 54 and by carefully adjusting the degree of overlap with one another, a straight line flow relationship can be obtained as illustrated in FIG. 6. It will be seen here that, regardless of the supply pressure, the total flow through the valve assembly bears a straight line relationship to the number of turns of the valve stem from the closed position provided the discharge pressure is constant. Typical dimensions and spacing relationships are illustrated in FIG. 2 and in the Table set out below although it will be appreciated that these dimensions are illustrative only and not restrictive on the scope of the invention.

TABLE

| Orifice Group A | ⅛ inch dia. 8 holes (see FIGS. 3 & 4) |
|---|---|
| Orifice Group B | 3/16 inch dia. 8 holes |
| Orifice Group C | ⅛ inch dia. 8 holes FIGS. 3 & 4 |

| Orifice Group Spacings | |
|---|---|
| Dimension D | 0.122 inch |
| Dimension E | 0.154 inch |
| Dimension F | 0.185 inch |
| Dimension G | 0.215 inch |
| Dimension H | 0.248 inch |
| Chamber Diameter | 0.75 inch. |

Since the control member 50 is performing only a flow control function and not a shut-off function, it does not need to fit tightly within the cylindrical chamber 52. A reasonable degree of clearance, e.g. two or three thousandths of an inch, is quite acceptable. Since flow through the valve assembly does not start until the control member is a substantial and predetermined distance above the shut-off position, the shut-off ball 48 immediately moves to a position well spaced above the valve seat 46 at the instant flow commences thus ensuring that there is no high velocity cavitation across the valve seat and thus no wire drawing effect or erosion. The valve seat 46 as shown provides a thin line contact with the shut-off ball 48 that will not allow for surface jamming or collection of dirt and debris. This is important in cases where the supply water is heavily contaminated.

FIG. 7 shows curves of differential vs. volume flows for given degrees of valve opening expressed as the number of turns of the valve stem. The curves show that the design provides for low degree parabolic flow increases in response to increases in pressure differential which is in contrast to many prior art valves which show very high degree flow increases for small differential pressure increases; hence they do not provide good control. The ideal curve for FIG. 7 would be a straight line; however, the straight-line relationship shown in FIG. 6 is the more important one and it would appear, based on a study of fluid dynamic laws for non-compressible flows, that straight-line relationships for both scenarios are not reasonably possible.

The hydrant structure described is fully serviceable from above ground, without digging it up, this being achieved by removing the control handle 20, the packing nut 22, packing 24 and subsequently removing the valve stem 18 by unscrewing the same. Since the valve insert 34 has a hexagonal exterior shape, a special elongated wrench can be lowered downwardly and engaged with the valve insert 34 whereby the same may be unscrewed from the valve body 12. Groove 66 in insert 34 allows the latter to be readily gripped by the tool and lifted upwardly. Since the valve seat is integrally formed with the valve insert 34, it is of course removed at the same time together with the shut-off ball 48. Hence, it will be seen that all operating components of the valve can easily be removed for servicing or replacement.

In the embodiment illustrated, the valve body 12 is provided with a drip-check valve 70. This valve 70 is provided with a spring-loaded ball check arrangement which moves to a closed position under a small internal pressure. When the valve is shut off, the pressure within the hydrant drops to a relatively low level and the spring unseats the ball thereby to allow all water to drain out of the hydrant. This feature is of importance in sub-freezing conditions as would of course be encountered when the hydrant is used in conjunction with snowmaking equipment and the like.

By virtue of the location of the packing 24 which is in a stuffing box located generally central to the main water flow, heat from the water flow is effectively used to ensure no freeze-up of the valve stem.

The materials for the hydrant are, generally speaking, selected to provide long wear and resistance to corrosion. Those skilled in the art will be able to select suitable material for fulfilling these objections. The hydrant may of course be provided in a variety of sizes depending upon end use requirements.

We claim:

1. A valve assembly, comprising,
   (a) a valve body,
   (b) a valve insert in said valve body defining a flow passage, said valve insert having a plurality of flow outlet orifices therefrom spaced therealong,
   (c) a valve seat in said valve insert and located in said flow passage,
   (d) shut-off means comprising a ball in said valve insert and engageable with said valve seat to make line contact therewith, and
   (e) a close fitting control member in said flow passage for closing said flow outlet orifices in a closed position, and movable along said flow passage to free said ball from said valve seat and then, after moving a predetermined distance along said flow passage to avoid high velocity cavitation, selectively opening said flow outlet orifices in dependance of the position of said control member along said flow passage to control the rate of flow of fluid through said valve seat, along said flow passage and out of the opened flow orifices into said valve body.

2. The valve assembly of claim 1, wherein said flow orifices are so sized and arranged that the total flow passing through said flow orifices varies directly, as the position of the control member along said flow passage, at a constant valve outlet pressure.

* * * * *